United States Patent
Cole et al.

(10) Patent No.: US 9,134,716 B2
(45) Date of Patent: Sep. 15, 2015

(54) DETECTION OF BLOCKAGES AND INTERRUPTIONS WITH AN ASPIRATING SMOKE DETECTOR (ASD)

(75) Inventors: Martin Terence Cole, Patterson Lakes (AU); Martin Fischer, Bülach (CH); Markus Loepfe, Feldmeilen (CH)

(73) Assignee: SIEMENS SCHWEIZ AG, Zürich (CH)

( * ) Notice: Subject to any disclaimer, the term of this patent is extended or adjusted under 35 U.S.C. 154(b) by 461 days.

(21) Appl. No.: 13/810,297

(22) PCT Filed: Jul. 11, 2011

(86) PCT No.: PCT/EP2011/061777
§ 371 (c)(1),
(2), (4) Date: May 16, 2013

(87) PCT Pub. No.: WO2012/007434
PCT Pub. Date: Jan. 19, 2012

(65) Prior Publication Data
US 2013/0238138 A1   Sep. 12, 2013

(30) Foreign Application Priority Data

Jul. 15, 2010   (EP) .................................... 10169742

(51) Int. Cl.
*G05B 15/02* (2006.01)
*G08B 17/10* (2006.01)
*G08B 29/04* (2006.01)

(52) U.S. Cl.
CPC ............... *G05B 15/02* (2013.01); *G08B 17/10* (2013.01); *G08B 29/043* (2013.01)

(58) Field of Classification Search
None
See application file for complete search history.

(56) References Cited

U.S. PATENT DOCUMENTS

| 5,163,818 | A  | 11/1992 | Betsill et al. |
| 7,162,374 | B2 | 1/2007  | Burkhardt |
| 7,440,100 | B2 | 10/2008 | Siemens |

(Continued)

FOREIGN PATENT DOCUMENTS

| CN | 1688872      | 10/2005 |
| DE | 102004044094 | 3/2006  |
| EP | 0696787      | 2/1996  |

(Continued)

OTHER PUBLICATIONS

Chinese Office Action for related Chinese Patent Application No. 201180034911.0, issued Sep. 19, 2014, 20 pages (with partial English and German language translations).

(Continued)

*Primary Examiner* — Sean Shechtman
*Assistant Examiner* — Steven Garland
(74) *Attorney, Agent, or Firm* — Staas & Halsey LLP

(57) ABSTRACT

An aspirating smoke detector detects blockages and interruptions in a pipe system. Air is aspirated, by a ventilator and via the pipe system, from rooms and devices that are to be monitored, and monitoring takes place for any characteristics of burning. The air flow of at least one part of the aspirated air is measured, as is the air temperature. A blockage signal is emitted if the air flow falls below a predetermined lower limit value and/or an interruption signal is emitted if the air flow rises above a predetermined upper limit value. The rotational speed of the ventilator is increased as air temperature rises and reduced as air temperature lowers.

17 Claims, 3 Drawing Sheets

(56) References Cited

U.S. PATENT DOCUMENTS

2010/0271219 A1* 10/2010 Lang .......................... 340/628
2011/0284091 A1 11/2011 Livchak et al.

FOREIGN PATENT DOCUMENTS

| EP | 1006500 | 6/2000 |
| EP | 1056062 | 11/2000 |
| EP | 1638062 | 3/2006 |
| EP | 10169742.3 | 7/2010 |
| RU | 2 351 918 C2 | 4/2009 |
| WO | WO 2010/065793 A1 | 6/2010 |
| WO | PCT/EP2011/061777 | 7/2011 |

OTHER PUBLICATIONS

International Search Report for PCT/EP2011/061777, mailed on Sep. 20, 2011.
Chinese Office Action for related Chinese Patent Application No. 201180034911.0, issued Jan. 8, 2014, 11 pages.
Notice of Allowance mailed Jul. 18, 2014 for corresponding Russian Patent Application No. 2013106506/08(009664) with German translation.

* cited by examiner

DETECTION OF BLOCKAGES AND INTERRUPTIONS WITH AN ASPIRATING SMOKE DETECTOR (ASD)

CROSS REFERENCE TO RELATED APPLICATIONS

This application is based on and hereby claims priority to International Application No. PCT/EP2011/061777 filed on Jul. 11, 2011 and European Application No. 10169742.3 filed on Jul. 15, 2010, the contents of which are hereby incorporated by reference.

BACKGROUND

The invention relates to a method for detecting blockages and interruptions in a pipe system of an aspirated smoke detector. The technical term for such detectors is ASD (Aspirated Smoke Detector).

The invention also relates to an aspirated smoke detector.

From the European published application EP 1 638 062 A1, a method is known for detecting blockages and interruptions in the pipe system of an aspirating fire detector, with which the fire detector simultaneously monitors air for characteristics of burning via the pipe system from one or more areas to be monitored or items of electrical equipment. The aspirating fire detector monitors a mass and/or volume flow determined by an air flow sensor and/or on the basis of current ventilator data by comparison with predetermined limit values. A correction value is determined, which represents changes in the properties of the system including the aspiration pipe and ventilator, based on changes in the density of the air and/or in at least one environmental parameter induced by a change in air density. This correction value is used to correct the mass and/or volume flow measured value and/or to adjust the limit values.

From the European published application EP 0 696 787 A1, a method is known for the detection of fires and gases in areas or in electrical or electronic equipment, with which a representative volume proportion of the spatial air or the cool air flow of the equipment unit is drawn off and conducted to a measurement chamber with at least one detector for the detection of characteristics of burning. The flow of the conducted air is monitored for changes. In addition, pressure fluctuations, in particular of the atmospheric air pressure, which take effect on the drawn off and conducted air are compensated for. To this effect the output signal from an air flow sensor is corrected by the output signal of a pressure sensor.

For the monitoring of the air flow, the air volume flow $\dot{V}$ of the drawn off representative air portion quantity is significant. This should therefore remain as constant as possible. The air volume flow can be measured, for example, by a fan wheel anemometer or by a thermal air flow sensor, the output signal of which is a measure of an air mass flow $\dot{m}$ which is approximately proportional to the air volume flow.

The mass flow $\dot{m}$ and the volume flow $\dot{V}$ are in this situation, as is known, linked to one another according to the physical relationship $$\dot{m} = \rho \cdot \dot{V} \tag{I}$$

by the density $\rho$. The latter is linked according to the physical relationship $$\rho = \frac{p}{R_f \cdot T} \tag{II}$$

to the air pressure p, to the gas constant $R_f$ for the air, and to the air temperature T. The density $\rho$ is therefore proportional to the air pressure p and inversely proportional to the air temperature T. The gas constant $R_f$ is dependent in a determinant manner on the air density, according to the following physical relationship:

$$R_f = \frac{R_l}{1 - \varphi \cdot p_d / p \cdot (1 - R_l / R_d)} \tag{III}$$

where $\varphi$ is the relative air humidity, $R_l$ is the gas constant for dry air, $R_d$ the gas constant of water vapor, p the ambient pressure, and $p_d$ the saturation vapor pressure of water in air.

The method described in EP 1 638 062 A1 in the introduction is however complex with regard to the determination of the correction value, wherein this correction value is intended to represent changes in the properties of the system including the aspiration pipe and ventilator, based on changes in the density of the air and/or at least one environmental parameter incurred by a change in the air density.

A further disadvantage lies in the inertia of the correction intervention, i.e. in the correction of the air volume flow measured value or air mass flow value respectively, issued by the air flow sensor, and in the correction of the upper and lower limits for the air volume flow and for the air mass flow respectively in the event of an interruption or a blockage.

SUMMARY

Taking this as a basis, one possible object is to provide a simpler and, at the same time, more dynamic method for monitoring the air flow with an aspirated smoke detector.

A further possible object is to provide an aspirated smoke detector which exhibits a simplified and, at the same time, more dynamic air flow monitoring arrangement.

According to the inventors' proposals, air is aspirated by a ventilator and via the pipe system from areas and devices that are to be monitored, and monitoring takes place for any characteristics of burning. In addition, the air flow of at least one part of the aspirated air is measured, as is the air temperature. A blockage signal is emitted if the air flow falls below a predetermined lower limit value. An interruption signal is emitted if the air flow rises above a predetermined upper limit value. The rotational speed of the ventilator increases as the air temperature rises and decreases as the air temperature falls.

The core of the proposals lies in recognition of the fact that if, at an assumed constant ventilator rotational speed, the temperature of the aspirated air rises or falls, then, as a consequence of this, the air flow, i.e. the air volume flow or the air mass flow, decreases or increases, and that this decrease or increase in the air flow can be compensated again by a corresponding increase or decrease in the ventilator rotational speed.

As a result of this, no adjustments or corrections need to be made at all to the output signal or to the limit values for an interruption or for a blockage, apart from a filtering which may be necessary of the output signal of the air flowmeter for the suppression of the noise and interference signal. As a result, the monitoring of the air flow is substantially simplified. Due to the avoidance of adjustment, this monitoring is, at the same time, more dynamic. The output signal of the air flowmeter is therefore compared directly with fixed predetermined limit values for blockages or interruptions. The limit values may lie, for example, at ±20% above an air flow mean value determined at the time of commissioning the system. The air flow mean value is typically a mean air volume flow value, measured in liters per second.

The ventilator rotational speed is preferably essentially linear, in particular increased or decreased proportionally to the measured air temperature. In this situation it is assumed that the air flow adjusted in the pipe system, at around an operational working temperature of the aspirated smoke detector, such as, for example, 20° C., is approximately proportional to the ventilator rotational speed n.

According to a preferred variant of the method, the ventilator rotational speed is adjusted as a function of the air temperature, in such a way that the air flow, i.e. the air volume flow or air mass flow respectively, remains essentially unchanged. In this case, the increase or decrease can be determined by way of an empirical function, such as by a mathematical function of the second, third, or higher order. The mathematical function may also exhibit a linear limitation factor, which, if a predeterminable upper air temperature limit is exceeded and/or a predeterminable lower air temperature limit is undercut, leaves the ventilator rotational speed unchanged.

The term "adjustment of the ventilator rotational speed" is understood to mean that this is regulated to a fixed rotational speed in the sense of a closed loop.

According to a further variant of the method, the air pressure is additionally measured and the ventilator rotational speed decreased as the air pressure increases and increased as the air pressure decreases. As a result, on the one hand the influence of the altitude location of an installed system which is to be monitored, such as, for example, a location at an altitude of over 2000 meters, can be compensated. On the other hand, the influence of substantial meteorological air pressure changes on the air flow, such as, for example, during a thunderstorm, can be at least approximately compensated for by a correspondingly changed setting of the ventilator rotational speed.

According to one variant of the method, the ventilator rotational speed is decreased or increased inversely proportionally to the air pressure, i.e. regulated to a corresponding ventilator rotational speed.

The ventilator rotational speed is preferably adjusted as a function of the air pressure in such a way that the air flow remains essentially unchanged. In this case, too, the decrease or increase respectively can be determined by way of an empirical function, such as, for example, by a mathematical function of the second, third, or higher order. The mathematical function may exhibit a limitation function, which, if a predeterminable upper air pressure limit is exceeded and/or a predeterminable lower air pressure limit is undercut, leaves the ventilator rotational speed unchanged.

To summarize, the ventilator rotational speed is increased or decreased respectively as a function of the measured air temperature and the measured air pressure. For this purpose, a common function can be formed which represents the two measured physical input values of air temperature and air pressure in one ventilator rotational speed value to be set.

According to a further method variant, in addition to the air temperature and, as appropriate, the air pressure, the air humidity is also measured. The ventilator rotational speed is then decreased as the air humidity increases and increased as the air humidity decreases. The air humidity may in this situation be determined as an absolute or relative air humidity.

As a result, the influence of substantial changes in air humidity on the air mass flow, such as, for example, in climate-controlled IT systems which are to be monitored, or due to meteorological changes, such as, for example, due to fog, can at least approximately be compensated for by a correspondingly changed setting of the ventilator rotational speed.

The ventilator rotational speed is preferably adjusted as a function of the air humidity, i.e. of the measured absolute or relative air humidity, in such a way that the air flow remains essentially unchanged.

In this case, too, the decrease or increase respectively can be determined by way of an empirical function. The function can in turn exhibit a limitation function, which, if a predeterminable upper limit for the air humidity is exceeded and/or if a predeterminable lower air humidity value is undercut, leaves the ventilator rotational speed unchanged.

To summarize, the ventilator rotational speed is therefore increased or decreased as a function of the measured air temperature and the measured air humidity and, as appropriate, the measured air pressure. To achieve this, a common function can be formed which represents the two measured physical input values of air temperature and air humidity, or even all three input values, air temperature, air humidity, and air pressure, in one ventilator rotational speed value to be set.

For preference, the air temperature of the aspirated air is measured. This can be carried out, for example, by a temperature sensor integrated in the air flowmeter. If no minor temperature fluctuations are to be expected, such as, for example, in climate-controlled areas, then the ambient temperature in the region of the aspirated smoke detector can be measured. The same applies to the air pressure to be measured, and/or to the air humidity to be measured. These can be measured in the aspirated air flow or separated from it in the region of the aspirated smoke detector.

The inventors also propose an aspirated smoke detector corresponding to the proposed method, which exhibits at least one detector for characteristics of burning, with an evaluation unit for emitting a warning or fire alarm, and a ventilator with a pipe system connected thereto for conducting air to the detector. The aspirated smoke detector exhibits an air flowmeter for measuring the air flow of at least one part of the aspirated air, and a temperature sensor for measuring the air temperature in particular of the aspirated air. It further comprises an air flow monitoring device for emitting a blockage signal in the event of the air flow falling below a predetermined lower limit value, and for emitting an interruption signal in the event of the air flow exceeding a predetermined upper limit value The aspirated smoke detector exhibits an imaging device which is arranged such as to increase the ventilator rotational speed as the air temperature increases and decrease it as the air temperature decreases. Such an imaging device can be an analog and/or digital electronic circuit, which, for example, exhibits ND converters, amplifiers, comparators, operational amplifiers for the electronic imaging of the characteristic curves, etc. In the simplest situation, this device is a microcontroller, which is present "in any event" for the overall control of the aspirated smoke detector. The imaging function of the physical input value of air temperature and, as appropriate, of the air pressure and the air humidity into one ventilator rotational speed reference value is preferably simulated by program steps, which are carried out by the microcontroller, as appropriate by drawing on electronically deposited table values. An appropriate computer program can be deposited in a non-volatile memory of the microcontroller. It may, as an alternative, be loaded from an external memory. Moreover, the microcontroller may exhibit one or more integrated A/D converter for the acquisition by a technical measurement device of the input values described heretofore, air temperature, air pressure, and air humidity.

According to one embodiment, the imaging device exhibits a first unit for the linear, in particular proportional, increase or decrease of the rotational speed of the ventilator as a function of the measured air temperature. The first unit can be arranged in such a way that the (anticipated) air flow, i.e. the air volume flow or, respectively and essentially proportional to this, the air mass flow, remain essentially unchanged.

According to a further embodiment, the aspirated smoke detector exhibits an air pressure sensor for measuring the air pressure, in particular of the aspirated air. The imaging device exhibits in this case a second unit for, in particular, the inversely proportional decrease or increase of the ventilator rotational speed as a function of the measured air pressure, in such a way that the (anticipated) air flow remains essentially unchanged.

Alternatively or in addition, the aspirated smoke detector exhibits an air humidity sensor for measuring the air humidity, in particular of the aspirated air. For this purpose the imaging device exhibits a third unit for decreasing or increasing respectively the ventilator rotational speed as a function of the measured air humidity in such a way that the (anticipated) air flow remains essentially unchanged.

The first, second, and third units may also exhibit or reference an electronically deposited table, which allocates a respective ventilator rotational speed value to air temperature values and, as appropriate, to air pressure and/or air humidity values. This value can be output, for example, via a D/A converter as a reference value for an electronic engine timing unit of the ventilator. The engine timing unit can in this situation already be integrated in the ventilator. It exhibits, for the regulating of the ventilator rotational speed, in particular an input for the actual value of the current ventilator rotational speed. This actual value may, for example, derive from a tachogenerator of the ventilator motor.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
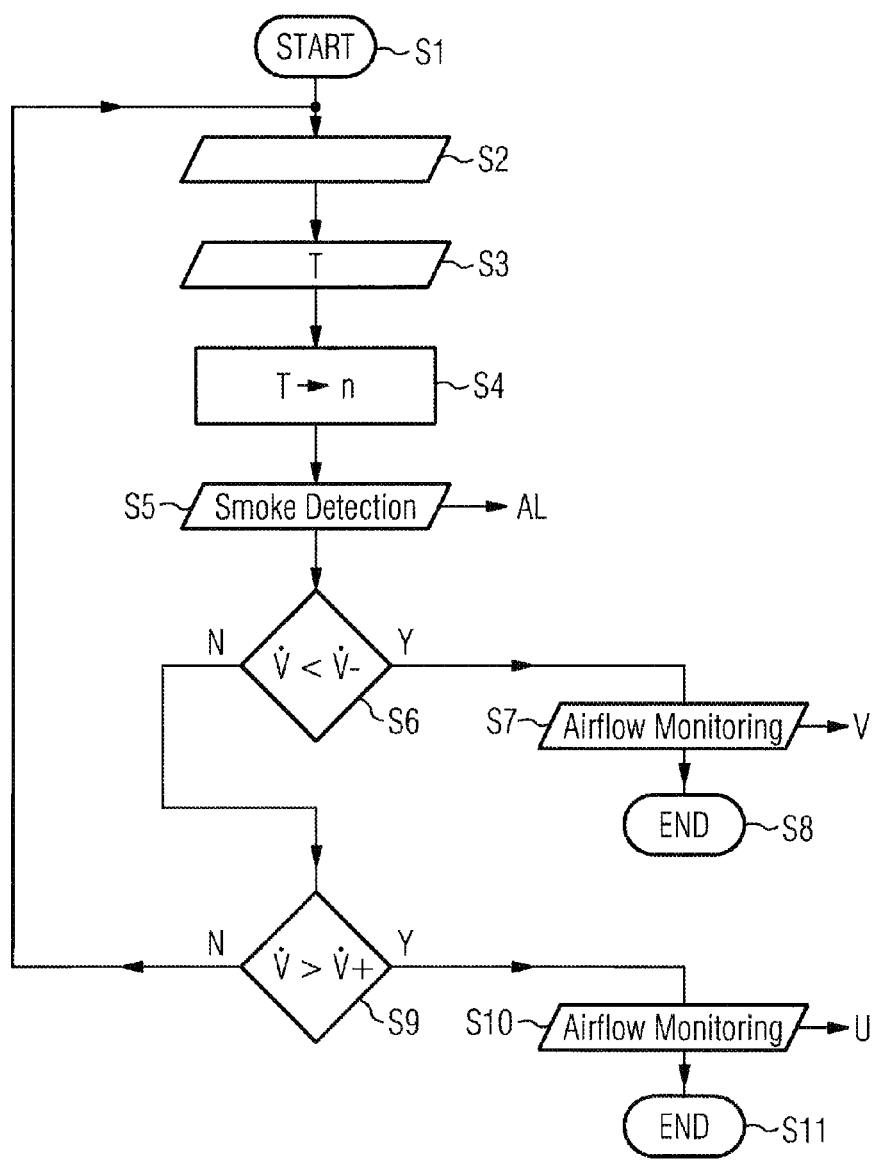
FIG. 1 shows an example of a flow diagram to explain the proposed method.

Reference will now be made in detail to the preferred embodiments of the present invention, examples of which are illustrated in the accompanying drawings, wherein like reference numerals refer to like elements throughout.

FIG. 1 shows an exemplary flow diagram to explain the proposed method for the detection of blockages and interruptions in a pipe system of an aspirated smoke detector, in which air is aspirated by a ventilator via the pipe system from the areas and devices which are to be monitored. The areas to be monitored may be IT or server areas. The devices may be electrical or electronic devices, such as control cabinets or containers.

In step S2, for the acquisition of the air flow, by way of example, the air volume flow $\dot{V}$ of at least a part of the aspirated air is measured. The part of the aspirated air may amount, for example, to only 2% of the total air flow to be monitored.

In step S3 the air temperature T is measured, preferably the air temperature of the aspirated air.

In step S4, the rotational speed n of the ventilator is increased (in a regulated manner) as the air temperature increases, and decreased (in a regulated manner) as the air temperature decreases.

In the following step S5, the aspirated air is monitored for characteristics of burning, and a signal, in particular a fire alarm signal AL, is issued if at least one of the characteristics of burning acquired or measured exceeds a predetermined limit value. The term "characteristics of burning" is understood to mean physical values which are subject to measurable changes in the area surrounding an outbreak of fire, such as, for example, the ambient temperature, the solid or liquid or gas portion in the ambient air or ambient radiation. In particular, the formation of smoke particles or smoke aerosols is detected, or the formation of steam or combustion gases.

In step S6 a test is carried out as to whether the measured air volume flow $\dot{V}$ falls below a predetermined lower limit value $\dot{V}-$. If this is the case, a blockage signal V is issued in step S7.

Otherwise, a check is carried out in step S9 as to whether the measured air volume flow $\dot{V}$ exceeds a predetermined upper limit value $\dot{V}+$. If this is the case, then in step S10 an interruption signal U is issued. The references S8 and S11 designate the respective ends of the flow diagram.

Figure 2:
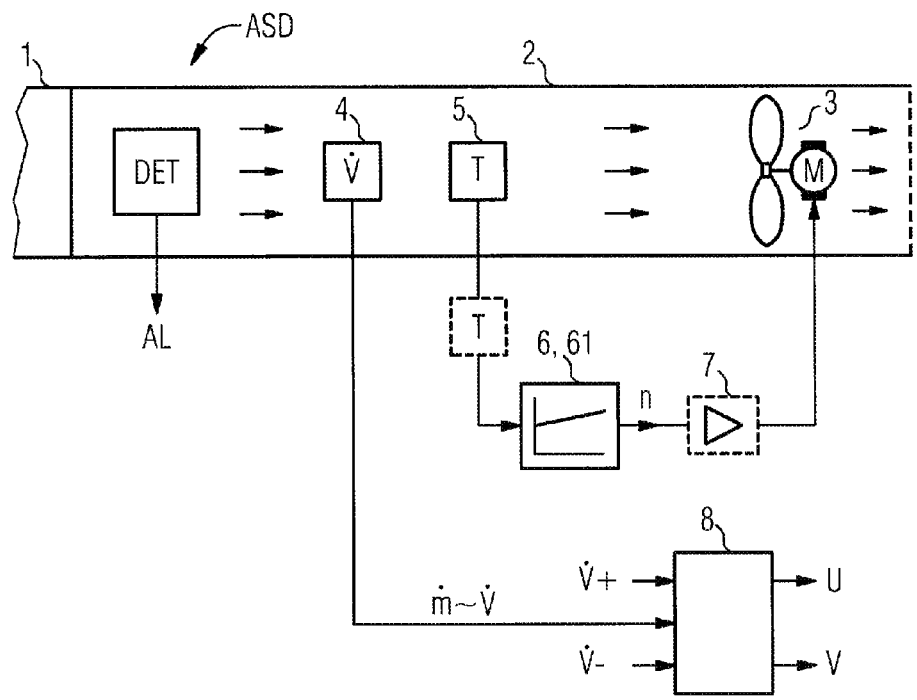
FIG. 2 shows an example of a proposed aspirated smoke detector, in a first embodiment.

FIG. 2 shows an example of a proposed aspirated smoke detector ASD according to a first embodiment. Such smoke or fire detectors exhibit an aspiration/detector unit 2 and a pipe system 1 which can be connected to this, with a plurality of aspiration apertures arranged in a distributed manner. These aspiration apertures may be arranged several meters apart from one another, and be allocated to different objects or spatial areas. The aspiration/detector unit 2 comprises a ventilator 3, such as an axial or radial ventilator. By this, at least a part of the air in the area or from the equipment is then conducted to a detector DET for the monitoring of the aspirated air for characteristics of burning. The detector DET, which preferably operates in accordance with the optical scatter principle, continually analyzes the air samples conducted to it, and issues a warning or fire alarm signal AL if at least one of the characteristics of burning exceeds a respective limit value. To do this, the detector DET exhibits an evaluation unit, not further designated, for issuing the warning or fire alarm signal AL.

The aspirated smoke detector ASD shown by way of example further exhibits an air flowmeter 4 for measuring the air volume flow $\dot{V}$ of at least a part of the aspirated air. In this situation the air volume flow $\dot{V}$ of the total aspirated air may be measured, or only a part of the air, such as, for example, by a bypass or a pipe probe. The air flowmeter 4 measures the volume of the air flowing through per time unit, i.e. the air volume flow $\dot{V}$. The air flowmeter 4 may be, for example, a fan wheel anemometer.

The air flowmeter 4 is preferably a thermal anemometer, such as a hot-wire anemometer. For particularly precise measurement, such an anemometer may exhibit four temperature-dependent resistors, in particular platinum measuring shunt resistors, which are wired in a Wheatstone bridge circuit.

Depending on the physical effect principle, such a thermal anemometer practically measures the air mass flow m, which is proportional to the density of the aspirated air, dependent to a certain degree on the air temperature, air pressure, and the air humidity (symbolized by the relationship $\dot{m}$–$\dot{V}$). In order for such a thermal anemometer to provide as precise a measured value as possible for the air volume flow $\dot{V}$, it may exhibit integrated sensors appropriate for the compensation of temperature, air pressure, and/or air humidity, such as a temperature sensor, an air pressure sensor, and/or an air humidity sensor. As an alternative, or in addition, this compensation can be "jointly taken into account" by the imaging device 6 described hereinafter with its first unit 61 and, as appropriate, with its second and third unit 63 (see FIG. 6).

In addition, a temperature sensor 5 for measuring the air temperature T is arranged in the air flow. As an alternative, as represented by broken lines, it can also be arranged outside the air flow in the aspiration/detector unit 2, if no major temperature fluctuations are to be anticipated. The air flow meter 4 and the temperature sensor 5 can also be formed as a joint sensor.

The aspirated smoke detector ASD further comprises an air flow monitoring device 8 for emitting a blockage signal V in the event of the air volume flow $\dot{V}$ falling below a predetermined lower limit value $\dot{V}$–, and for emitting an interruption signal U in the event of the air volume flow $\dot{V}$ exceeding a predetermined upper limit value $\dot{V}$+. The air flow monitoring device 8 shown by way of example in FIG. 2 in this situation corresponds in its function to a window discriminator.

The aspirated smoke detector ASD exhibits an imaging device 6, which is arranged such as to increase the rotational speed n of the ventilator 3 as the air temperature T rises, and decrease it as the air temperature T decreases. The preferentially linear, in particular proportional increase or decrease respectively is symbolized by the regulator symbol in the box of the imaging device 6. On the output side, the imaging device 6 exhibits a corresponding ventilator rotational speed value n, which is conducted to an electronic engine timing unit 7 as a reference value. The engine timing unit 7 may, as is known with many axial or radial ventilators, already be integrated in the ventilator. Due to the change in the ventilator rotational speed n the situation is attained that the air volume flow $\dot{V}$ to be anticipated remains essentially unchanged. In other words, the output signal of the air flow meter 4, i.e. of the air volume meter, does not change substantially if only the air temperature T of the aspirated air changes, and the rotational speed of the ventilator is thereupon adjusted in the appropriate manner to compensate for the temperature effect.

Figure 3:
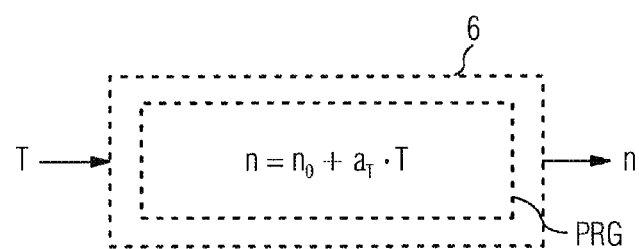
FIG. 3 shows an example of an imaging device of the aspirated smoke detector according to FIG. 2.

FIG. 3 shows an example of an imaging device 6 of the aspirated smoke detector ASD according to FIG. 2.

The imaging function shown in the box in this situation $$n = n_0 + a_T \cdot T \qquad \text{(IV)}$$

describes the linear representation of the measured air temperature T in a rotational speed n for the ventilator. A predeterminable basic rotational speed, such as, for example, 5000 rpm, for a predeterminable temperature, such as, for example, at 25° C., is designated by $n_o$. A suitable predeterminable rise coefficient for the representation is designated by $a_T$. In this rise coefficient $a_T$, if appropriate, joint consideration may also be given to a temperature compensation in the event of an air mass meter being used, as described in FIG. 2. A computer program is designated by PRG, which may exhibit program steps for the computed reproduction of the linear representation described heretofore. This program PRG can be run together with other programs, such as, for example, for the evaluation of the optical detector signals of the detector DET, on a microcontroller of the aspirated smoke detector ASD.

Figure 4:
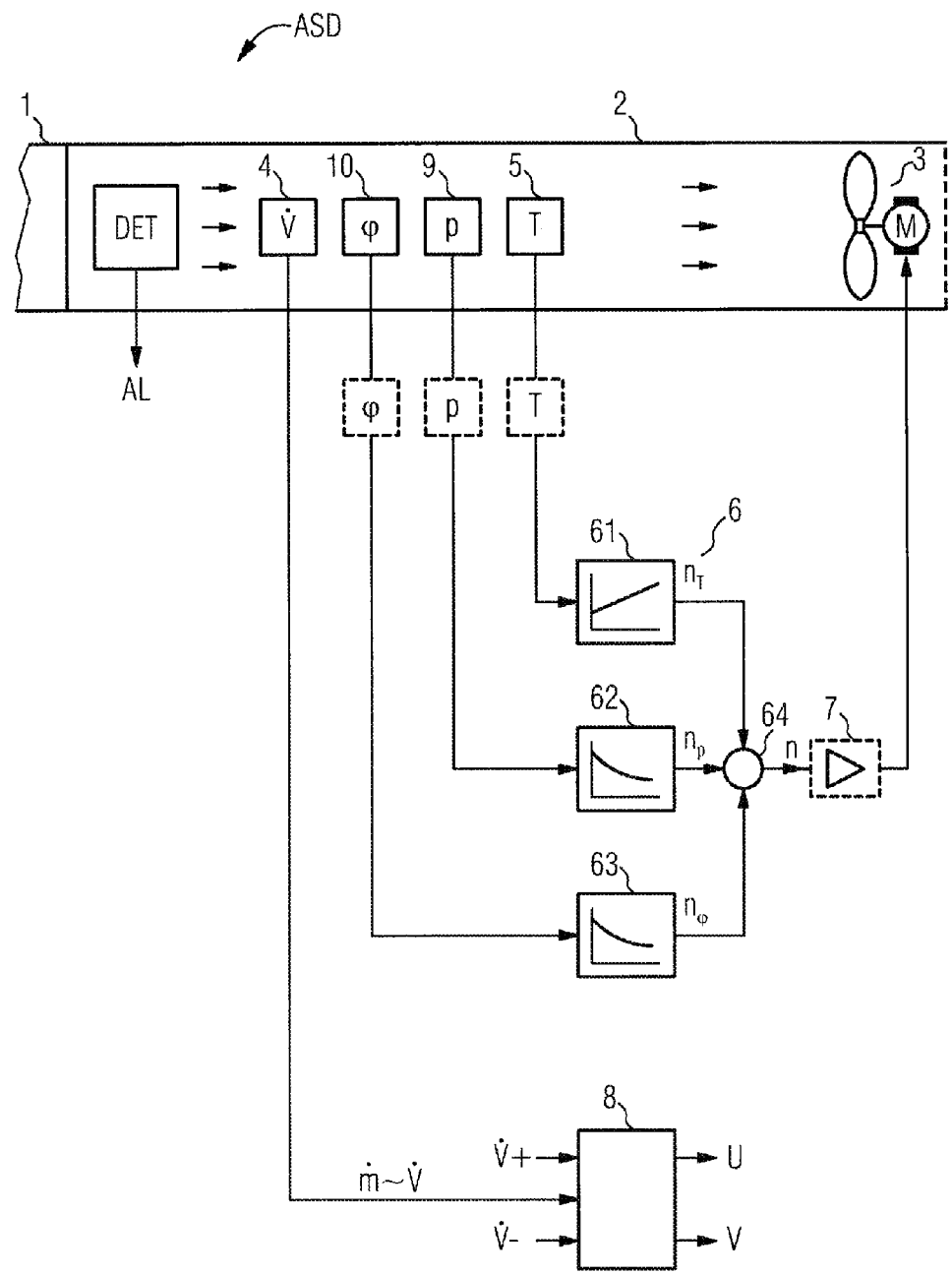
FIG. 4 shows an example of an aspirated smoke detector according to a second embodiment.

FIG. 4 shows an example of an aspirated smoke detector ASD according to a second embodiment. In this case, the aspirated smoke detector ASD exhibits, in addition to the air volume meter 4 and the temperature sensor 5, an air pressure sensor 9 for measuring the air pressure p and an air humidity sensor 10 for measuring the air humidity φ. In the present example, all the sensors 5, 9, 10 are arranged in the aspiration/detector unit 2. In consequence, the aspirated air flow flows around them. As an alternative, these sensors 5, 9, 10, as represented by broken lines, may also be arranged outside the air flow. As FIG. 4 further shows, the respective sensor signals for air temperature T, air pressure p, and air humidity φ are conducted to an imaging device 6.

This imaging device 6 exhibits first unit 61 for the essentially linear, and in particular proportional, increase or decrease respectively of the ventilator rotational speed n, $n_T$ as a function of the measured air temperature T. It further exhibits second unit 62 for, in particular, the inversely proportional decrease or increase respectively of the ventilator rotational speed n, $n_p$ as a function of the measured air pressure p. It further exhibits third unit 63 for decreasing or increasing respectively the ventilator rotational speed n, $n_\square$ as a function of the measured air humidity $\square$, which remains essentially unchanged in the sum of the air volume flow $\dot{V}$ to be anticipated. Designated as $n_T$, $n_p$, $n_\square$ are part ventilator rotational speeds dependent on the respective input values T, p, φ, which in the present example are conducted to an evaluation device 64. In the simplest case, the evaluation function 64 is an averaging device for the ventilator rotational speed n to be determined. It may also exhibit weighting, in order to weight the respective influence of the input values T, p, and φ onto the ventilator rotational speed n, such that, in sum, the air volume flow $\dot{V}$ to be anticipated remains essentially unchanged in the event of all the input values T, p, and φ being changed.

As a supplement to this, it is noted that, in the part ventilator rotational speeds $n_T$, $n_p$, $n_\square$, a temperature compensation, air pressure compensation, and/or air humidity compensation can also be jointly taken into account in the event of the use of an air mass meter, as described in FIG. 2.

Finally, as a reference value, the determined ventilator rotational speed n is conducted to an electronic engine timing unit for the ventilator 3. For this purpose, the control unit evaluates a tacho signal, not represented in any further detail, from the ventilator 3 in order to regulate the ventilator rotational speed n.

Figure 5:
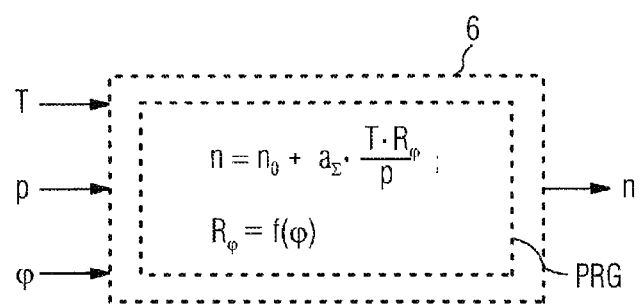
FIG. 5 shows an example of a further imaging device of the aspirated smoke detector.

FIG. 5 shows an example of a further imaging device 6 of the aspirated smoke detector ASD. In the present example, the imaging device 6 may be realized by a computer program PRG, which forms all three input values T, p and φ by way of the linear function shown by way of example $$n = n_0 + a_\Sigma \cdot \frac{T \cdot R_\varphi}{p} \qquad \text{(V)}$$

into the ventilator rotational speed n as a reference value, such that, in sum, the air volume flow $\dot{V}$ to be anticipated remains essentially unchanged. Designated in turn by $a_\Sigma$ is a suitable predeterminable rise coefficient. Designated by $R_f$ is the gas constant, as a function of φ, i.e. dependent in a determinant manner on the air humidity φ (see Equation III).

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for detecting a blockage or an interruption in a pipe system of an aspirated smoke detector (ASD), comprising:
    using a ventilator to aspirate air via the pipe system, from an area or device to be monitored for burning;
    measuring an air flow for at least a part of the aspirated air;
    measuring an air temperature of the aspirated air;
    emitting a blocking signal in response to the air flow falling below a predetermined lower limit value;
    emitting an interruption signal in response to the air flow exceeding a predetermined upper limit value;
    increasing a rotational speed of the ventilator as the air temperature increases; and
    decreasing the rotational speed of the ventilator as the air temperature decreases.

2. The method as claimed in claim 1, wherein the rotational speed of the ventilator is increased or decreased in a substantially linear fashion, proportional to the air temperature.

3. The method as claimed in claim 1, wherein the rotational speed of the ventilator is adjusted as a function of the air temperature in such a way that air flow remains substantially unchanged.

4. The method as claimed in claim 1, wherein
    an air pressure is measured,
    the rotational speed of the ventilator is decreased as the air pressure increases, and
    the rotational speed of the ventilator is increased as the air pressure decreases.

5. The method as claimed in claim 4, wherein the rotational speed of the ventilator is decreased or increased in a manner substantially inversely proportional to the air pressure.

6. The method as claimed in claim 4, wherein the rotational speed of the ventilator is set as a function of the air pressure in such a way that air flow remains substantially unchanged.

7. The method as claimed in claim 1, wherein
    air humidity is measured,
    the rotational speed of the ventilator is decreased as the air humidity decreases, and
    the rotational speed of the ventilator is increased as the air humidity increases.

8. The method as claimed in claim 7, wherein the rotational speed of the ventilator is adjusted as a function of the air humidity in such a way that air flow remains substantially unchanged.

9. The method as claimed in claim 1, wherein air pressure and/or air humidity of the aspirated air is measured.

10. The method as claimed in claim 1, wherein, for measuring the air flow, the air volume flow or the air mass flow is measured.

11. The method as claimed in claim 1, wherein
    the air flow measured is a volumetric air flow rate, and
    the rotational speed of the ventilator is increased or decreased to maintain a substantially constant mass air flow rate.

12. An aspirated smoke detector (ASD) comprising:
    a detector to evaluate characteristics of burning and selectively emit a warning or fire alarm;
    a ventilator with a pipe system connected thereto for conducting aspirated air to the detector;
    an air flow meter to measure air flow of at least a part of the aspirated air;
    a temperature sensor to measure air temperature of the aspirated air;
    an air flow monitoring device to emit a blockage signal in response to the air flow falling below a predetermined lower limit value, and to issue an interruption signal in response to the air flow exceeding a predetermined upper limit value; and
    an imaging device, increasing a rotational speed of the ventilator as the air temperature increases and decreasing the rotational speed of the ventilator as the air temperature decreases.

13. The aspirated smoke detector (ASD) as claimed in claim 12, wherein the imaging device has a first unit to increase or decrease the rotational speed of the ventilator in a substantially linear fashion, proportional to the air temperature.

14. The aspirated smoke detector (ASD) as claimed in claim 12, wherein the imaging device has a first unit to increase or decrease the rotational speed of the ventilator in such a way that the air flow remains essentially unchanged.

15. The aspirated smoke detector (ASD) as claimed in claim 12, wherein
    the aspirated smoke detector (ASD) further comprises an air pressure sensor to measure air pressure of the aspirated air,
    the imaging device has a second unit to increase or decrease the rotational speed of the ventilator in a manner inversely proportional to the air pressure in such a way that the air flow remains essentially unchanged.

16. The aspirated smoke detector (ASD) as claimed in claim 12, wherein
    the aspirated smoke detector (ASD) further comprises an air humidity sensor to measure air humidity of the aspirated air, and
    the imaging device has a third unit to increase or decrease the rotational speed of the ventilator as a function of the air humidity in such a way that the air flow remains essentially unchanged.

17. The aspirated smoke detector (ASD) as claimed in claim 12, the air flow monitoring device is an air volume meter or an air mass meter.

\* \* \* \* \*